United States Patent [19]

Curtil

[11] 4,232,641
[45] Nov. 11, 1980

[54] METHOD AND DEVICE FOR IMPROVING THE EFFICIENCY OF INTERNAL COMBUSTION ENGINES

[75] Inventor: Rémi Curtil, Eaubonne, France

[73] Assignee: Societe d'Etudes de Machines Thermiques S.E.M.T., Saint-Denis, France

[21] Appl. No.: 882,758

[22] Filed: Mar. 2, 1978

[30] Foreign Application Priority Data

Mar. 7, 1977 [FR] France .................................. 77 06614
Feb. 14, 1978 [FR] France .................................. 78 04140

[51] Int. Cl.³ ........................ F02D 13/00; F02B 25/00
[52] U.S. Cl. .................................... 123/76; 123/404; 123/316
[58] Field of Search ............... 123/75 E, 105, 109, 123/76

[56] References Cited

U.S. PATENT DOCUMENTS

| | | | |
|---|---|---|---|
| 659,944 | 10/1900 | Weed | 123/105 |
| 949,969 | 2/1910 | Brown | 123/105 |
| 1,467,998 | 9/1923 | Brown | 123/75 E |
| 1,869,455 | 8/1932 | Zaikowsky | 123/75 E |
| 2,202,227 | 5/1940 | Noland | 123/75 E |
| 2,292,233 | 8/1942 | Lysholm | 123/75 E |
| 2,408,448 | 10/1946 | Rossman | 123/105 |
| 3,416,502 | 12/1968 | Weiss | 123/105 |
| 3,919,986 | 11/1975 | Goto | 123/75 E |
| 4,084,556 | 4/1978 | Villella | 123/75 E |

OTHER PUBLICATIONS

Philip H. Smith, "Valve Mechanisms for High-Speed Engines: Their Design and Development," Jun. 1967, p. 151, FIG. 5.4.

*Primary Examiner*—Ronald H. Lazarus
*Attorney, Agent, or Firm*—Kenyon & Kenyon

[57] ABSTRACT

A method for improving the efficiency of an internal combustion engine such as a Diesel engine, by ensuring, on the one hand, efficient cylinder scavenging, particularly at light engine loads and/or low speeds, and on the other hand, a reduction of the effective compression ratio resulting in temperature reduction preferably under high engine loads and/or at high speeds. Said method consists in creating, for each engine cylinder and each engine cycle, a reserve of compressed air, during the intake stage, with the intake air and in compressing it by retarding the closing of the intake valve. A non-return valve is accommodated in the intake conduit and said gas reserve is contained in the space between the intake valve and the non-return valve.

12 Claims, 16 Drawing Figures

METHOD AND DEVICE FOR IMPROVING THE EFFICIENCY OF INTERNAL COMBUSTION ENGINES

The present invention has essentially for its object a method and a device particularly intended to ensure, on the one hand, good cylinder scavenging, especially under light loads and/or low speeds, and on the other, a decrease in the effective compression ratio, resulting in temperature reduction, preferably under heavy loads and/or high speeds, without prejudicing engine efficiency and starting performance.

According to a known method, in order to improve engine efficiency, particularly in supercharged type engines, an attempt is made to ensure good cylinder scavenging, allowing an increase in the amount of air admitted to each cylinder and a cooling of, in particular, the exhaust valves.

It may happen, however, especially during starting and at low speeds (idle running or no-load running), that the intake pressure is insufficient, compared with the exhaust pressure, to ensure cylinder scavenging. For example, in the most unfavourable case, the exhaust pressure may reach 1.8 kg/sq.cm while the intake pressure is only about 1 kg/sq.cm. Owing to the usual exhaust-valve closing lag and intake-valve opening lead, a communication unavoidably exists between the intake manifold and the exhaust manifold so long as the exhaust valve is not closed. Consequently, if the exhaust pressure during this period of time is higher than the intake pressure, not only a correct scavenging of the cylinders cannot be ensured, but on the contrary a highly unfavourable counter scavenging occurs. Moreover, in the case of the most unfavourable difference in pressure (0.8 kg/sq.cm), the turbine of each turbosupercharger must be put out of action and the compressor has to be driven mechanically to avoid excessive counter-scavenging, a procedure that is highly complicated, expensive and considerably increases consumption (by about 30%).

This drawback can be remedied by reducing or even removing the overlap between the intake-valve opening period and the exhaust-valve closing period, thus obviating the risk of counter-scavenging, but on the other hand, no scavenging is obtained, so that the power of the engine is reduced and the exhaust-valves are not cooled.

An essential purpose of the invention is, in particular, to obviate the risk of counter-scavenging, preferably under light loads and/or at low speeds, while at the same time permitting cylinder scavenging, without the necessity of supercharging at low engine speeds, thereby avoiding mechanical driving of the turbosupercharger compressor in the aforesaid most unfavourable case.

Another essential purpose of the invention is to obtain a variable effective compression ratio and a variable useful piston stroke or displacement volume, thus permitting, in particular, the supercharging of very-high compression-ratio engines which cannot normally be supercharged because of the excessively high maximum combustion pressures, or the increase, in considerable proportions, in the supercharging ratio of already supercharged engines, while at the same time reducing to a minimum their disadvantages during operation on starting and under partial loads.

Consequently, the method according to the invention is characterized by creating during the intake stage a reserve of gas such as intake air and compressing it by retarding the closing of the intake valve substantially beyond the usual values, e.g. by an angle of crank-shaft rotation of more than 50°.

According to another characterizing feature, the method of the invention comprises creating, for each cylinder and during each cycle, before the exhaust stage, a reserve of compressed air and in scavenging the cylinder by expanding such compressed air at the beginning of the scavenging stage of the following cycle.

According to still another characterizing feature, the method of the invention comprises creating each reserve of compressed air in the corresponding intake conduit.

Another essential purpose of the invention is to reduce the temperature, particularly towards the end of the compression stage, preferably during heavy-load and/or high-speed running, by reducing the effective compression ratio. To this end, the method according to the invention is characterized by providing, for said air reserve, at least one air-escape means for by-passing the air towards the intake manifold.

The invention also provides a device for carrying out the aforesaid method, characterized in that it comprises a non-return valve accomodated in the intake conduit, either in the cylinder head or in the connecting conduit between the intake manifold and the cylinder head, the confinement space of the said air reserve being defined between the intake valve and the non-return valve.

According to another characterizing feature of the invention, the device according to a first form of embodiment comprises a by-pass conduit extending between the intake manifold and the associated connecting conduit and opening into the latter at a point located downstream of the said non-return valve, the said by-pass conduit comprising a valve the degree of opening of which is controllable.

According to another characterizing feature of the invention and to a second form of embodiment allowing the said by-pass conduit to be dispensed with and therefore the device to be considerably simplified, the said non-return valve is integral with the by-pass conduit valve and is constituted by axial orifices provided in the by-pass conduit valve head and adapted to be closed by, for example, a membrane secured to the said valve head.

According to another characterizing feature of the invention, the degree of opening of the said by-pass conduit valve is controlled by external means in accordance with the engine speed and/or load and has at least two values, i.e. a maximum and a minimum value, respectively, or varies either discretely or continuously between those two limit values.

According to another feature of the invention, when the by-pass conduit valve is in its closed position, the non-return valve permits the passage of the intake air or mixture towards the cylinder but prevents the mixture already in the cylinder from being forced out therefrom during engine starting, light-load and/or low-speed operation.

According to another characterizing feature of the device, the by-pass conduit valve in its open position permits, on the one hand, the passage of intake air or mixture towards the cylinder, and on the other hand, allows the mixture already in the cylinder to be forced out therefrom during engine heavy-load and/or high-speed operation.

Other advantages, characterizing features and details of the invention will appear more clearly as the following explanatory description proceeds with reference to the appended drawings given solely by way of example and wherein.

Figure 1:
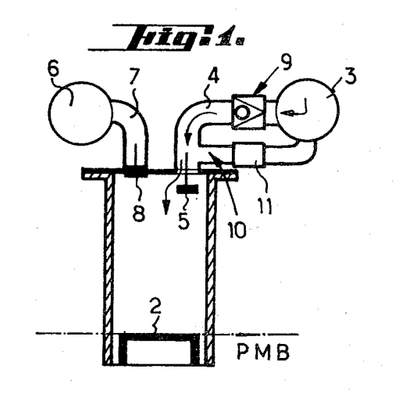
FIGS. 1 to 4 diagrammatically show an engine cylinder provided with a first form of embodiment of the device according to the invention and illustrating the various stages of the method of the invention during engine starting, light-load an/or low-speed operation.

Referring to FIG. 1, there is diagrammatically shown an engine cylinder 1 with its piston 2, an intake manifold 3 with an intake conduit 4 connecting it to a cylinder head, an intake valve 5, an exhaust manifold 6 with a conduit 7 connecting it to the cylinder head, and an exhaust valve 8.

According to a first form of embodiment of the device of the invention, there are provided a non-return valve 9 so mounted in the intake conduit or connecting conduit 4 as to ensure a unidirectional communication in the direction from the intake manifold to the cylinder, at least one by-pass conduit 10 substantially equal in diameter to the connecting conduit 4 and connecting the intake manifold 3 to the conduit 4 at a point located downstream (with respect to the flow of intake air) of the non-return valve 9. In the by-pass conduit 10 is a valve 11, the opening of which is controlled, for example, by supercharging pressure.

Figure 7:
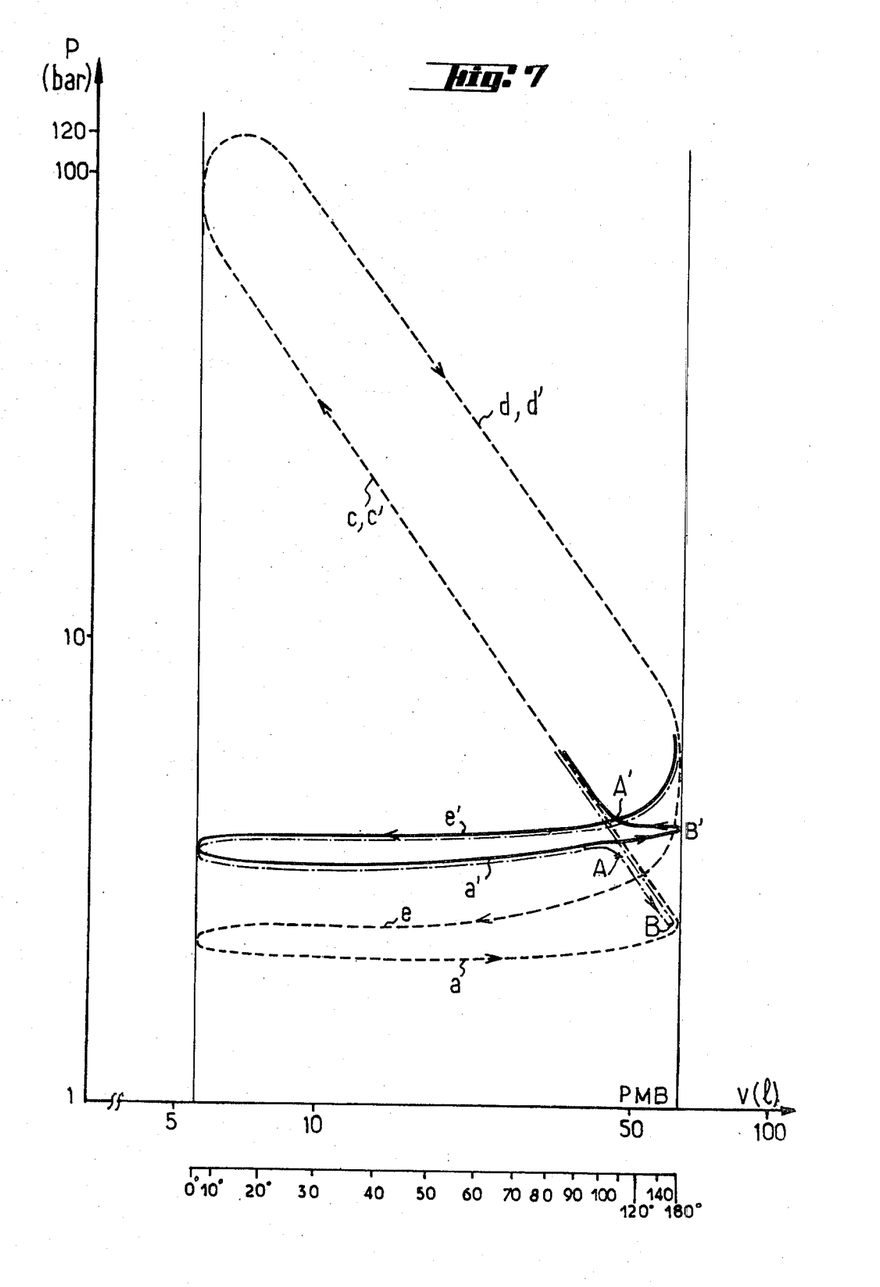
FIG. 7 is a comparative graphic representation, in logarithmic co-ordinates, of various engine heavy-load and/or high-speed running cycles, including a cycle according to the invention.

Before describing in detail the method according to the invention, reference is made to FIG. 7, which illustrates the following engine cycles under heavy loads and/or high speeds: in dashed lines—a conventional Diesel cycle; in dot- and -dash lines—a gas-engine cycle known as a "Miller cycle"; and in heavy lines—a Diesel cycle according to the invention.

The Miller cycle, developed for gas engines, is characterized by an intake-valve closing lead which is varied according to engine load by making the instant of intake-valve closing dependent on the supercharging pressure or on the engine load value. The heavier the load, the greater the lead of the valve closing instant (which may be most at 60 degrees before the bottom dead center of the piston).

In the example illustrated in the case of running under heavy load, the closing instant of the intake valve is shown by point A. Since the intake valve is closed before bottom dead center (PMB), an expansion of the intake air contained in the cylinder takes place during the last portion of the piston downward travel (portion AB of Miller cycle).

Figure 8:
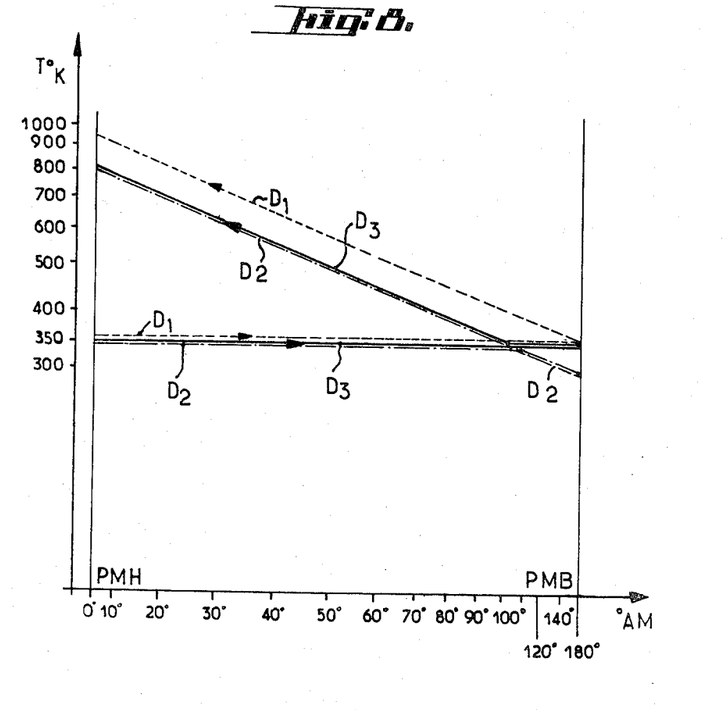
FIG. 8 is a graphic representation, on a logarithmic scale, of the variations of the compression temperatures (°K.) of the engine cycles illustrated in FIG. 7, as a function of the angle of rotation of the crank-shaft (°AM)

This expansion caused by an increase in the intake volume for a fixed amount of gas has the advantage of reducing the temperature of the gases towards the end of the compression stroke as compared to a conventional engine. This appears in FIG. 8, which illustrates the compression temperature variations in the three cycles examined and wherein the dashed line $D_1$ represents the compression temperatures in a conventional Diesel cycle, the dot- and -dash line $D_2$ represents the compression temperatures in a Miller cycle, and the heavy line $D_3$ represents the compression temperatures in a cycle according to the invention.

However, to compensate for such a lead in the closing of the intake valve before the bottom dead center of the piston, it is necessary to provide a certain increase in the supercharging pressure. This results in an intake line (a') extending above the intake line (a) of a conventional engine.

In the Miller system, under light loads the intake-valve closing lead is reduced to allow the whole compression stroke to be used, whereas under heavy loads there is a reduced effective compression stroke, which makes it necessary for the intake-valve closing instant to be controlled by the value of the load.

There is also shown in FIG. 7, in the case of heavy loads, the engine cycle according to the invention (in heavy lines), the compression and expansion stages corresponding substantially to those of the conventional cycle, whereas the exhaust stage (e') corresponds substantially to that of the Miller cycle.

According to the invention, it is sought to retain the advantages of the Miller cycle while at the same time ensuring cylinder scavenging, especially under light loads and/or at low speeds.

Referring again to FIG. 7, it is observed that the difference between the Miller cycle and that of the invention lies mainly in the fact that in the cycle of the invention the intake valve closes after the bottom dead center (at point A' of the curve, substantially symmetrical with the point A of the Miller cycle with respect to the bottom dead center). In other words, instead of an intake closing lead there is on the contrary a closing lag.

Under such conditions, when the by-pass is open, both the intake volume and the temperature of the gases at the end of the compression stroke are reduced compared to the conventional Diesel cycle with a shortened effective compression stage. In particular, under light loads and/or at low speeds, the by-pass being closed, the complete compression stroke is used as in the Miller cycle, but at the same time the counter-scavenging phenomenon is avoided. Efficient cylinder scavenging is thus obtained, as will be shown hereinafter with reference to FIGS. 1 to 6.

FIG. 1 shows the cylinder 1 during the intake stroke, with the intake valve 5 open and the exhaust valve 8 closed. Assuming that the engine is running under a light load and/or at a low speed, the valve 11 is in its closed position, i.e. the intake air freely enters the cylinder through the connecting conduit 4 in a conventional manner.

Figure 2:
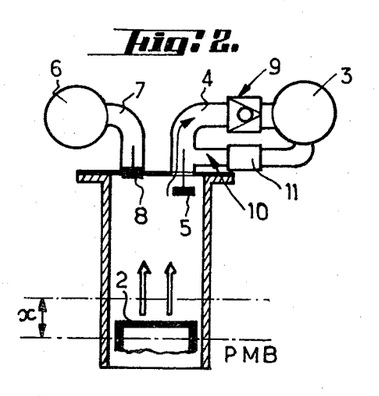

In FIG. 2 the piston is shown during its upward motion before the closing of the intake valve. Under such conditions, the intake air tends to be forced out towards the intake manifold 3, but this is prevented by the non-return valve 9.

Figure 3:
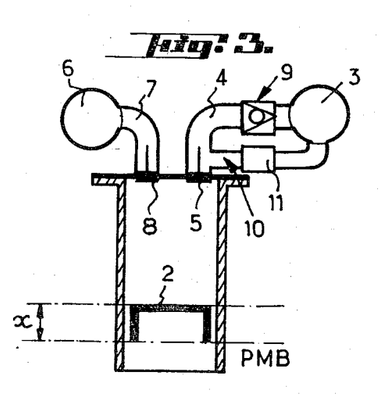

In FIG. 3 the piston 2 is shown at the instant of closing of the intake valve, corresponding substantially to a closing lag of, for example, more than 50 degrees. Thus, during the travel (x) of piston 2 between the positions shown in FIGS. 1 and 3, a certain amount of intake air has been confined in the connecting conduit 4 and has been compressed by the piston 2 during its travel between the bottom dead center and the point which the piston has reached when the intake valve closes.

Figure 4:
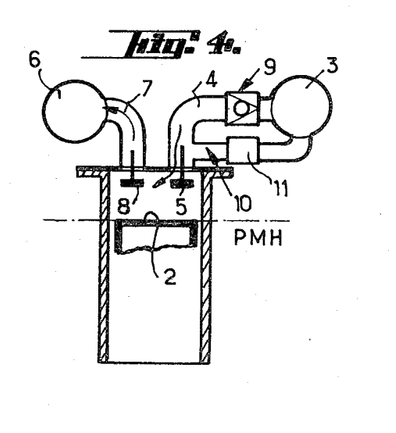

In FIG. 4, the piston 2 is shown in the vicinity of the top dead center (PMH) towards the end of the exhaust stage, the end of the compression and the expansion stages having taken place in a manner known per se. Owing to the closing lag of the exhaust valve 8 and the opening lead of the intake valve 5, there will be a period of time where both valves will be open simultaneously. Consequently, the compressed gas confined in the intake conduit 4 will expand and scavenge the cylinder, thus expelling the residual hot exhaust gases and cooling the exhaust valve. Thereafter the cycle begins again in the same manner.

In the case of an engine running at heavy load and/or high speed, the by-pass conduit 10 fulfills an important function. Indeed it is necessary, in order to limit the temperature at the end of the compression stroke as in the Miller system, to provide an escape path through the medium of the by-pass conduit 10.

Figure 5:
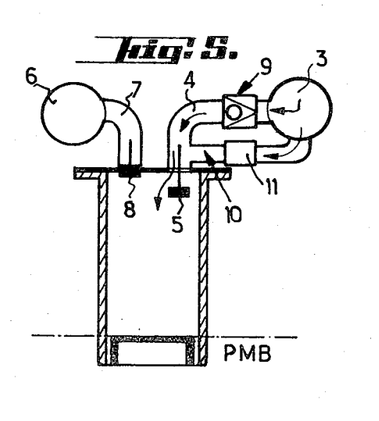
FIGS. 5 and 6 diagrammatically illustrate the stages of the method of the invention during heavy-load and-/or high-speed operation.

In FIG. 5 is shown a position of the piston corresponding to that of FIG. 1, but in this case the intake air enters the cylinder both through the connecting conduit 4 and the by-pass conduit 10.

Figure 6:
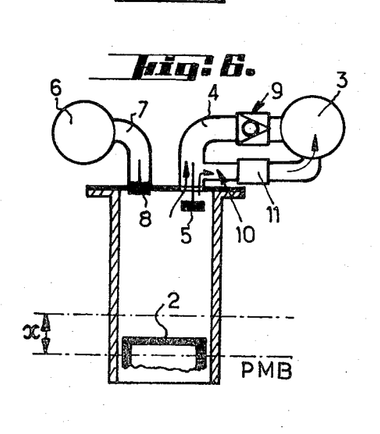

In FIG. 6 the piston is shown in a position corresponding to that of FIG. 2, during the upward motion of the piston before the closing of the intake valve, and in this case the intake air is forced out without forming a reserve of air under pressure.

In the foregoing the operation of the device has been described with respect mainly to the two extreme conditions corresponding to light loads and/or low speeds (valve 11 closed) and to heavy loads and/or high speeds (valve 11 open). At intermediate loads, the valve 11 will be more or less open, allowing the pressure within the connecting conduit 4 to be controlled.

Referring again to FIG. 7, the portion B' A' of the cycle according to the invention, corresponding, in the case of high loads and/or low speeds, to the travel of the piston between the bottom dead center and the closing of the intake valve, is approximately in the form of a plateau and corresponds to the effects produced by the intake valve closing lag, the effect of the non-return valve being annulled by the escape flow through the open by-pass conduit.

Thus, owing to the reserve of gas stored at the end of the intake stage in the conduit connecting the cylinder to the intake manifold, there is performed, as a result of the expansion of this compressed gas at the beginning of the scavenging stage of the following cycle, a scavenging of the cylinder particularly under light loads and/or low speeds, while at the same time the by-pass conduit allows the advantages of the Miller cycle to be retained, i.e. a reduction in the temperature of the exhaust gases at the end of the compression stage to be obtained, particularly under heavy loads and/or at high speeds.

In the example illustrated, the non-return valve 9 is shown to be located in immediate proximity to the point of connection of the conduit 4 with the intake manifold. Obviously, however, it may be placed closer to or farther from the intake valve, thus allowing the volume of the gas reserve to be fixed at any desired predetermined value. But whatever its position, counter-scavenging, particularly under light loads and/or at low speeds, is always prevented.

Figure 9:
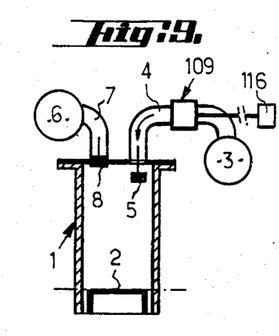
FIG. 9 diagrammatically shows an engine cylinder associated with a second form of embodiment of a device according to the invention.

Referring to FIG. 9, there is diagrammatically shown a second form of embodiment of the device according to the invention, comprising a device 109 mounted in the intake conduit, for example in the connecting conduit 4, which device performs the functions of both the non-return valve and the by-pass conduit valve in the first form of embodiment.

Referring more particularly to FIGS. 10 to 13, a device 109 comprises a valve 110 and a non-return valve 111. The stem of valve 110 extends parallel to the flow of intake mixture, with the valve head 114 directed towards the cylinder and its tail directed towards the intake manifold. The valve 110 cooperates with a seat 112 in such a manner that the valve opens in the contrary direction to that of the intake mixture flow. The non-return valve 111 comprises, for example, axial orifices 113 extending through the head 114 of the valve 110, and a membrane 115 attached to the valve head 114 and adapted to close the orifices 113 provided in the valve head.

The degree of opening of the valve 110 is controlled by external means 116 connected for example to the tail of the valve stem, which sealingly passes through the connecting conduit 4, e.g., in the region of a bend of the latter. This also applies to the by-pass conduit valve of the first form of embodiment.

The operation of the second form of embodiment of the device according to the invention is based on the same principle as the one described previously.

Figure 10:
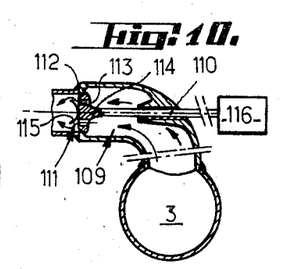
FIGS. 10 to 13 illustrate a second form of embodiment of the non-return valve and the by-pass conduit valve in four different positions, each corresponding to a given running condition of the engine.
Figure 11:
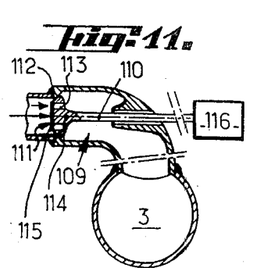
Figure 12:
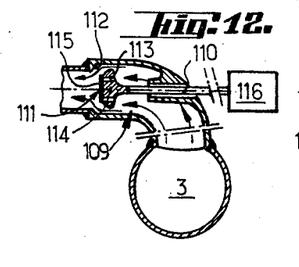

During engine starting or light-load and/or low-speed running, the valve 110 is in its closed position, i.e., applied to its seat 112. Under such conditions the non-return valve 111 during the intake stage is open, i.e., permits the passage of the mixture towards the cylinder through the connecting conduit 4 and the axial orifices 113 provided in the valve head 114, the membrane 115 being disengaged from the orifices 113 under the sucking action caused by the downward motion of the piston (FIG. 10). The mixture confined in the cylinder can escape only partially, by pressurizing the connecting conduit 4, because the mixture during the compression stage exerts on the membrane 115 a pressure which causes it to be applied to the valve head 114, thus closing the orifices 113. This pressure, on the other hand, does not open the valve 110, which is retained in closed position by external means 116. In other words, the non-return valve 111 prevents the compressed mixture from being forced beyond the connecting conduit 4 towards the intake manifold 3 (FIG. 11).

Figure 13:
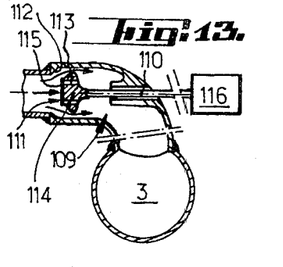

On the other hand, under high engine loads and/or speeds, the valve 110 is actuated by the control means 116 to a more or less open position, thus permitting, during the intake stage, the filling of the cylinder (FIG. 12), and, at the beginning of the compression stage, the escape of part of the compressed mixture (FIG. 13). When the valve 110 is in its open position, the non-return valve 111 is practically inoperative.

It is important to note that, since the most usual operating condition of the engine corresponds to an approximately fully open position of the valve 110, the non-return valve 111 operates only very seldom, thus increasing its life.

The device according to both forms of embodiment of the invention therefore allows the previously described method to be carried out very simply, which method comprises creating a reserve of compressed gas between the intake valve 5 and the device 9 or 109, preferably at low engine speeds and/or under light loads, the said gas reserve thereafter serving to scavenge the cylinder at the beginning of the scavenging stage of the following cycle, the valve 11 or 110 then being practically closed, reducing the effective compression ratio, particularly under heavy loads and/or at high speeds, the valve 11 or 110 then being in a more or less open position.

Such a device allows important advantages to be obtained, considering the effective compression ratio and the useful piston stroke or displacement volume in an engine equipped with such a device.

Figure 14:
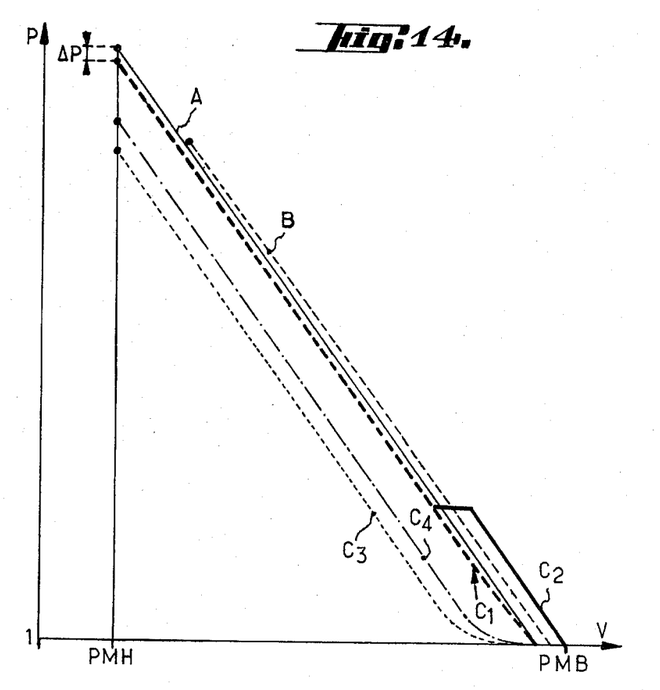
FIG. 14 is a graphic representation, in logarithmic co-ordinates, of compression variations as a function of volume for various engines, one of which is equipped with a device according to the invention.

Referring more particularly to FIG. 14, there are shown the compression graphs of various engines, namely:

graph A (in thin continuous lines) for a conventional engine, graph B (in thin dashed lines) for a low-compression-ratio engine, for example a large Diesel engine with a compression ratio lower than 10, and, graphs C1 to C4 for an engine equipped with a device according to the invention: graph C1 (in heavy dashed lines) corresponds to the curve of pressure against volume in the cylinder during starting with valve 11 or 110 closed; graph C2 (in heavy continuous lines) represents an idealized curve of pressure against volume during starting in the cylinder and the cylinder-head conduit with instantaneous closing of the intake valve at about 100 degrees of the crank-shaft after bottom dead center; graph C3 represents the pressure-volume curve with the valve 110 in completely open position; and graph C4 represents the pressure-volume curve for an intermediate opening of valve 110.

In examining these graphs and more particularly graphs C1 and C2, it is seen that at the beginning of the compression stage, graph C2 is shifted with respect to graph C1 by a value corresponding substantially to the volume of the cylinder-head conduit, the intake valve 5 being open. Especially worthy of note in comparing graphs A and C1, particularly at the end of the compression stage (in the vicinity of top dead center) is the fact that, in an engine equipped with a device according to the invention, there is a small loss of compression (ΔP) compared with a conventional engine when the valve 110 is substantially closed. In other words, the increase in detrimental volume through the medium of the device 109 has no serious consequences for the engine.

Such a device ensures to the engine a variable effective compression ratio which reaches a maximum on starting and a minimum at nominal power. Indeed, during starting, under light loads and/or at low speeds of the egine, the valve 110 being practically closed, the compression stage begins earlier, which means that the compression ratio is increased compared to the case where the valve 110 is in open position.

An engine equipped with such a device therefore combines the advantages of a low-compression-ratio engine under heavy loads and/or at high speeds, and the advantages of a conventional engine during starting, under light loads and/or at low speeds.

This variation of the effective compression ratio is tantamount to a variable piston stroke volume varying in the same direction as the compression ratio. Indeed, the non-return valve being closed, the useful piston stroke is increased.

Such a device also offers certain advantages. In particular, it permits the limitation of peak combustion pressures when the valve is open, thus allowing high power values to be obtained since it is possible to use higher supercharging pressures to compensate for the reduction in effective stroke volume. At partial loads and/or speeds, high efficiency is obtained with the usual compression ratios, the valve 110 being closed or slightly open.

Figure 15:
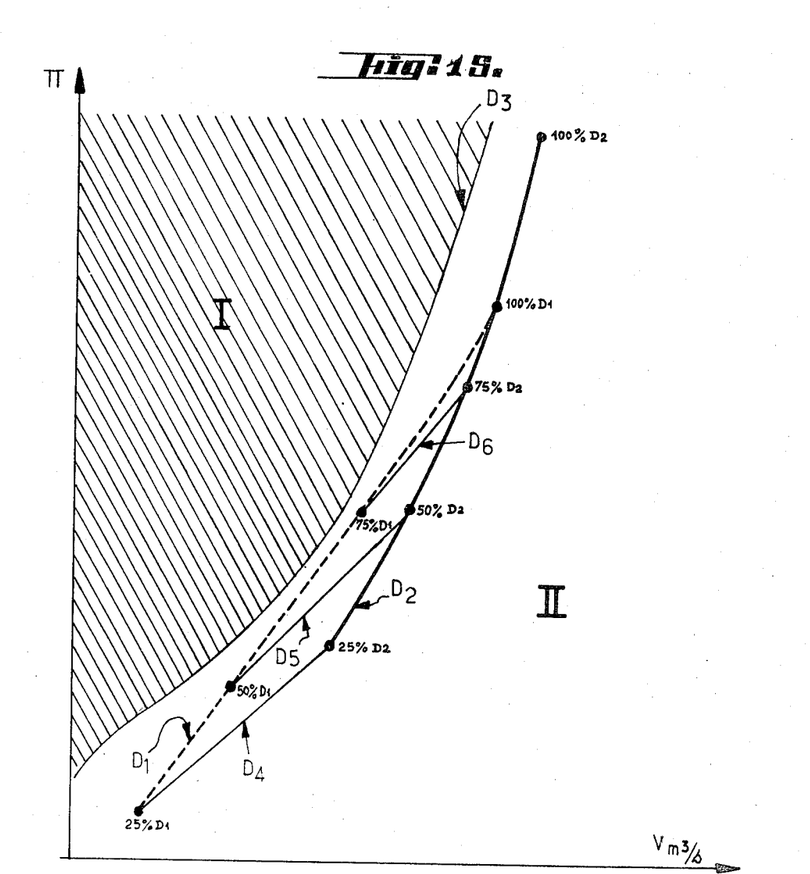
FIG. 15 is a graphic representation, relating to a supercharged engine, of the pressure ratio of the compressor as a function of the engine flow in the cases of a conventional engine and an engine equipped with a device according to the invention.

Such a device also offers another advantage which will be shown, with respect to a supercharged engine, with reference to FIG. 15. This Figure shows graphically the variations of the total compression ratio of the compression stage or stages as a function of the engine flow in the case of a conventional engine (curve D1) and in the case of an engine equipped with a device according to the invention (curve D2). In this graphical representation are also shown a curve D3 which indicates the pumping limit of the compressor of the supercharging stage and which divides the plane into two regions, namely a region I where operation is impossible and a region II where operation is possible, and curves D4, D5 and D6 correspond respectively to points of operation at different equal powers for the two curves D1 and D2, i.e. 25%, 50%, and 75% for the helix law.

This graphic representation shows an advantage derived from the variable effective cylinder volume, consisting in that, by reducing the load and speed of the engine in particular according to the helix law, there can be obtained, at engine speeds which are more reduced owing to the effective cylinder volume being increased by closing the valve 11 or 110, more flow absorbed by the engine, i.e. the pumping limit defined by the curve D3 is considerably departed from, thus ensuring a highly favourable effect. Otherwise stated, the supercharging air pressures obtained ahead the engine inlet are higher at partial speeds because the gas flow delivered to the turbine diminishes relatively little with engine speed owing to the increase of the useful cylinder volume.

Figure 16:
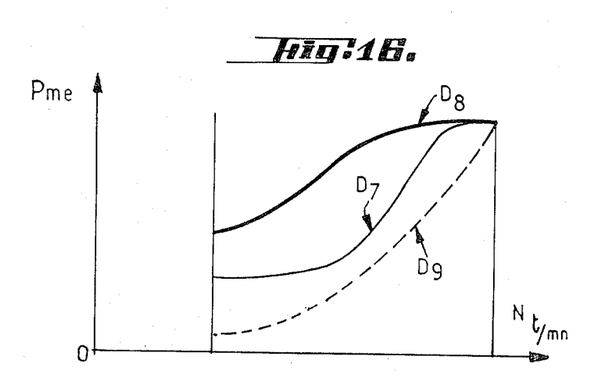
FIG. 16 is a graphic representation of the variations of torque or effective mean pressure as a function of speed in the particular case of a large, highly supercharged Diesel engine.

FIG. 16 illustrates the variations of the maximum effective mean pressure curve (Pme) for a large, considerably supercharged engine in the case of a conventional engine (curve D7), and in the case of a large engine equipped with a device according to the invention (curve D8); curve D9 illustrates the operation of a large engine complying with the helix law. It clearly appears from a comparison of such curves that higher torques can be achieved at partial speed with the device according to the invention.

It should also be noted that the device constituted by the valve 110 and the non-return valve 111 can be replaced by any equivalent device ensuring the same functions as those described previously. Moreover, the degree of opening of the valve 110 by the control means 116 (according for example, to engine speed and/or load) has at least two values, i.e. a minimum value and a maximum value, or varies either discretely or continuously between those two limit values.

Thus, with such a set of characteristics, it is quite possible to conceive a turbosupercharged engine better adapted to the natural characteristics of the turbocharger.

Another advantage of the invention lies in the improvement of the aptitude to acceleration and/or rapid load taking in the case of highly supercharged engines, owing to the possibility of scavenging the cylinder, while the valve is closed, even when the supercharging air pressure is lower than the gas pressure at the cylinder outlet, a condition that is frequent at the beginning of the transient acceleration and/or rapid load-taking stage.

The scavenging advantages obtained as a result of the use of the non-return valve also apply to the case of the non-supercharged engine.

Of course the invention is by no means limited to the forms of embodiment described and illustrated which have been given by way of example only. In particular, it comprises all means constituting technical equivalents to the means described, as well as their combinations, should the latter be carried out according to its spirit and used within the scope of the following claims.

What is claimed is:

1. A method for improving the efficiency of a four-stroke cycle internal combustion engine having an intake manifold, at least one cylinder, and for each cylinder a piston, an exhaust valve, an intake valve, and an intake passageway between the intake manifold and the intake valve, the method comprising for each engine cycle in each cylinder:
   opening the intake valve before the piston reaches top dead center at the end of the exhaust stroke and shutting the exhaust valve after top dead center during the intake stroke to define a period when both valves are open simultaneously;
   retarding the shutting of the intake valve until after the start of the compression stroke;
   selectively blocking the intake passageway at a location spaced from the intake valve to permit one-way flow of gas from the intake manifold through the intake passageway past said location but to prevent, at least for light engine loads, reverse flow through the intake passageway past said location to the intake manifold, said blocking location being selected to create a reserve chamber of predetermined volume in the intake passageway between the intake valve and said location, a reserve of gas being compressed in said chamber while the intake valve is open during the compression stroke and then being expanded through the intake and exhaust valves during the next period of simultaneous opening thereof to provide improved scavenging of the cylinder at the start of each intake stroke; and
   opening a path between the intake valve and the intake manifold at high engine loads for permitting the escape of at least part of said compressed gas reserve back into said manifold, thereby reducing the effective compression ratio at high load.

2. A method according to claim 1 wherein the degree of opening of said bypass path increases with increasing engine load.

3. A method according to claim 1 wherein the step of retarding the shutting of the intake valve comprises retarding the shutting of said valve until at least 50 degrees after bottom dead center at the beginning of the compression stroke.

4. Apparatus for improving the efficiency of a four-stroke cycle internal combustion engine having an intake manifold, a plurality of cylinders, a crankshaft, and, for each cylinder, a piston connected to the crankshaft, an exhaust valve, an intake valve, an intake conduit connecting the intake manifold to the intake valve, means for opening the exhaust valve for a predetermined angle of rotation of the crankshaft during each engine cycle, and means for opening the intake valve for a predetermined angle of rotation of the crankshaft during each engine cycle, wherein the improvement comprises:
   non-return valve means mounted in said intake conduit at a location spaced from the intake valve to provide a reserve chamber of predetermined volume in the conduit, said nonreturn valve permitting flow from the intake manifold therethrough but preventing flow in the reverse direction;
   said means for opening the exhaust valve being adjusted to open said exhaust valve during the exhaust stroke and to shut said exhaust valve after the piston reaches top dead center at the end of the exhaust stroke;
   said means for opening the intake valve being adjusted to open said intake valve before the piston reaches top dead center during the exhaust stroke and to shut said intake valve during the compression stroke to form a reserve of compressed gas in said reserve chamber during the beginning of each compression stroke prior to the shutting of the intake valve, so that said reserve is released into the cylinder upon the subsequent opening of the intake valve to provide effective scavenging during the period when both the intake and exhaust valves are open simultaneously;
   a bypass path around said non-return valve means connecting said intake valve to said intake manifold;
   bypass valve means in said bypass path; and means for selectively opening said bypass valve means at high engine loads to release at least part of said reserve of compressed gas for reducing the effective compression ratio of the cylinder at high engine loads.

5. Apparatus according to claim 4 wherein said means for opening the bypass valve means is responsive to engine load for varying the degree of opening of said bypass valve between a minimum value and a maximum value.

6. A device according to claim 5, wherein the degree of opening of said bypass valve varies discretely between said two limit values.

7. A device according to claim 5, wherein the degree of opening of said bypass valve varies continuously between said two limit values.

8. A device according to claim 5, wherein the degree of opening of said valve is maximum at high engine loads and is minimum at light engine loads.

9. Apparatus according to claim 4 wherein said bypass valve comprises a valve head mounted at said predetermined location of the non-return valve in the intake passageway, and said non-return valve is mounted on said valve head.

10. Apparatus according to claim 9 wherein said non-return valve comprises:
- a plurality of orifices extending through the valve head for providing communication between the intake valve side and the intake manifold side of the valve head and
- obdurating means attached to the valve head and adapted to open said orifices in response to a positive differential pressure between the intake manifold side and the intake valve side of the bypass valve head, and for shutting said orifices in response to a pressure differential in the reverse direction.

11. Apparatus according to claim 10 wherein said obdurating means comprises a flexible membrane attached to the intake valve side of the valve head for uncovering said orifices in response to a positive pressure differential between the intake manifold side and the intake valve side of the bypass valve head and for sealingly covering said orifices in response to a differential pressure in the reverse direction.

12. Apparatus according to claim 9 wherein said bypass valve means allows flow in both directions in its open position.

* * * * *